United States Patent
Dalsgaard et al.

(10) Patent No.: US 11,218,891 B2
(45) Date of Patent: Jan. 4, 2022

(54) ENHANCED RADIO LINK MONITORING FOR USER EQUIPMENT

(71) Applicant: Nokia Technologies Oy, Espoo (FI)

(72) Inventors: Lars Dalsgaard, Oulu (FI); Jussi-Pekka Koskinen, Oulu (FI); Li Zhang, Beijing (CN); Tero Henttonen, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/499,775

(22) PCT Filed: Mar. 29, 2018

(86) PCT No.: PCT/FI2018/050235
§ 371 (c)(1),
(2) Date: Sep. 30, 2019

(87) PCT Pub. No.: WO2018/178519
PCT Pub. Date: Oct. 4, 2018

(65) Prior Publication Data
US 2020/0037179 A1 Jan. 30, 2020

Related U.S. Application Data

(60) Provisional application No. 62/479,769, filed on Mar. 31, 2017.

(51) Int. Cl.
*H04L 1/00* (2006.01)
*H04W 24/04* (2009.01)
(Continued)

(52) U.S. Cl.
CPC ......... *H04W 24/04* (2013.01); *H04W 72/042* (2013.01); *H04W 72/048* (2013.01); *H04W 76/25* (2018.02); *H04W 76/38* (2018.02)

(58) Field of Classification Search
None
See application file for complete search history.

(56) References Cited

U.S. PATENT DOCUMENTS 10,567,987 B2 * 2/2020 Yi .............................. H04L 1/08

FOREIGN PATENT DOCUMENTS

WO 2016/114639 A1 7/2016

OTHER PUBLICATIONS

"Discussions on Enhanced RLM for feMTC", 3GPP TSG RAN WG4 Meeting #82, R4-1701910, Agenda Item: 7.22.3.2.2, Ericsson, Feb. 13-17, 2017, pp. 1-3.

(Continued)

*Primary Examiner* — Willie J Daniel, Jr.
(74) *Attorney, Agent, or Firm* — Squire Patton Boggs (US) LLP

(57) ABSTRACT

Systems, methods, apparatuses, and computer program products for enhanced radio link monitoring (RLM) are provided. One method may include signaling, by a network node, information to at least one user equipment. The information may include an indication of a maximum number of physical downlink control channel repetition and aggregation level(s). The indication may be independent from the physical downlink control channel repetition and aggregation level that the at least one user equipment is configured to monitor for data transfer.

17 Claims, 4 Drawing Sheets

(51) Int. Cl.
   *H04W 76/25* (2018.01)
   *H04W 76/38* (2018.01)
   *H04W 72/04* (2009.01)

(56) References Cited

OTHER PUBLICATIONS

"On Intra Cell Mobility Enhancement in Rel-14 FeMTC", 3GPP TSG-RAN WG4 Meeting #82, R4-1701893, Agenda Item: 7.22.3.2.2, Qualcomm Incorporated, Feb. 13-17, 2017, pp. 1-4.
"LS on New Event Reporting for Enhanced RLM for feMTC", 3GPP RAN WG4 Meeting #82, R4-1702469, Ericsson, Feb. 13-17, 2017, 1 page.
"LS on New Event Reporting for Enhanced RLM for eNB-IoT", 3GPP TSG-RAN WG4 Meeting #82, R4-1702483, RAN4, Feb. 13-17, 2017, 1 page.
"3rd Generation Partnership Project; Technical Specification Group Radio Access Network; Evolved Universal Terrestrial Radio Access (E-UTRA); Requirements for support of radio resource management (Release 14)", 3GPP TS 36.133 V14.2.0, Dec. 2016, pp. 1-2304.
"3rd Generation Partnership Project; Technical Specification Group Radio Access Network; Evolved Universal Terrestrial Radio Access (E-UTRA); Radio Resource Control (RRC); Protocol specification (Release 13)", 3GPP TS 36.331 V13.4.0, Dec. 2016, pp. 1-629.
International Search Report and Written Opinion received for corresponding Patent Cooperation Treaty Application No. PCT/FI2018/050235, dated Jul. 10, 2018, 14 pages.
"RLM Enhancements in Further Enhanced MTC", 3GPP TSG-RAN WG4 Meeting #80, R4-166625, Agenda item 8.24.1, Qualcomm Incorporated, August, 22-26, 2016, pp. 1-2.
Communication pursuant to Article 94(3) EPC issued in corresponding European Patent Application No. 18 721 086.9 dated Mar. 1, 2021.

\* cited by examiner

ENHANCED RADIO LINK MONITORING FOR USER EQUIPMENT

RELATED APPLICATION

This application was originally filed as PCT Application No. PCT/FI2018/050235, filed on Mar. 29, 2018, which claims priority from U.S. Provisional Application No. 62/479,769, filed on Mar. 31, 2017.

BACKGROUND

Field

Embodiments of the invention generally relate to wireless or mobile communications networks, such as, but not limited to, the Universal Mobile Telecommunications System (UMTS) Terrestrial Radio Access Network (UTRAN), Long Term Evolution (LTE) Evolved UTRAN (E-UTRAN), LTE-Advanced (LTE-A), LTE-A Pro, and/or 5G radio access technology or new radio access technology (NR). Some embodiments may generally relate to enhanced radio link monitoring for user equipment, such as narrowband devices, for example.

Description of the Related Art

Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (enhanced UTRAN), no RNC exists and radio access functionality is provided by an evolved Node B (eNodeB or eNB) or many eNBs. Multiple eNBs are involved for a single UE connection, for example, in case of Coordinated Multipoint Transmission (CoMP) and in dual connectivity.

Long Term Evolution (LTE) or E-UTRAN refers to improvements of the UMTS through improved efficiency and services, lower costs, and use of new spectrum opportunities. In particular, LTE is a 3GPP standard that provides for uplink peak rates of at least, for example, 75 megabits per second (Mbps) per carrier and downlink peak rates of at least, for example, 300 Mbps per carrier. LTE supports scalable carrier bandwidths from 20 MHz down to 1.4 MHz and supports both Frequency Division Duplexing (FDD) and Time Division Duplexing (TDD).

As mentioned above, LTE may also improve spectral efficiency in networks, allowing carriers to provide more data and voice services over a given bandwidth. Therefore, LTE is designed to fulfill the needs for high-speed data and media transport in addition to high capacity voice support. Advantages of LTE include, for example, high throughput, low latency, FDD and TDD support in the same platform, an improved end-user experience, and a simple architecture resulting in low operating costs.

Certain releases of 3GPP LTE (e.g., LTE Rel-10, LTE Rel-11, LTE Rel-12, LTE Rel-13) are targeted towards international mobile telecommunications advanced (IMT-A) systems, referred to herein for convenience simply as LTE-Advanced (LTE-A).

LTE-A is directed toward extending and optimizing the 3GPP LTE radio access technologies. A goal of LTE-A is to provide significantly enhanced services by means of higher data rates and lower latency with reduced cost. LTE-A is a more optimized radio system fulfilling the international telecommunication union-radio (ITU-R) requirements for IMT-Advanced while maintaining backward compatibility. One of the key features of LTE-A, introduced in LTE Rel-10, is carrier aggregation, which allows for increasing the data rates through aggregation of two or more LTE carriers.

$5^{th}$ generation (5G) or new radio (NR) wireless systems refer to the next generation (NG) of radio systems and network architecture. 5G is expected to provide higher bitrates and coverage than the current LTE systems. It is estimated that 5G will provide bitrates one hundred times higher than LTE offers (e.g., on the order of 10-20 Gbit/s). 5G will support at least enhanced mobile broadband (eMBB) and ultra-reliable low-latency-communication (URLLC). 5G is also expected to increase network expandability up to hundreds of thousands of connections. The signal technology of 5G is anticipated to be improved for greater coverage as well as spectral and signaling efficiency. 5G is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. In 5G or NR, the node B or eNB may be referred to as a next generation node B (gNB).

SUMMARY

One embodiment is directed to a method that may include signaling, by a network node, to one or more UE(s), information including an indication of the maximum number of physical downlink control channel (e.g., MPDCCH/NPDCCH) repetition and aggregation level(s). The indication may be independent from the physical downlink control channel repetition and aggregation level that the UE(s) is configured to monitor for data transfer.

Another embodiment is directed to an apparatus that may include at least one processor and at least one memory including computer program code. The at least one memory and the computer program code are configured, with the at least one processor, to cause the apparatus to signal to one or more UE(s), information including an indication of the maximum number of physical downlink control channel (e.g., MPDCCH/NPDCCH) repetition and aggregation level(s). The indication may be independent from the physical downlink control channel repetition and aggregation level that the UE(s) is configured to monitor for data transfer.

Another embodiment is directed to an apparatus that may include transmitting means for signaling, to one or more UE(s), information including an indication of the maximum number of physical downlink control channel (e.g., MPDCCH/NPDCCH) repetition and aggregation level(s). The indication may be independent from the physical downlink control channel repetition and aggregation level that the UE(s) is configured to monitor for data transfer.

Another embodiment is directed to a method that may include receiving, from a network node, information including an indication of the maximum number of physical downlink control channel (e.g., MPDCCH/NPDCCH) repetition and aggregation level(s) for a UE. In an embodiment, the indication may be received independent from the physical downlink control channel repetition and aggregation level that the UE is configured to monitor for data transfer.

Another embodiment is directed to an apparatus that may include at least one processor and at least one memory including computer program code. The at least one memory and the computer program code are configured, with the at least one processor, to cause the apparatus to receive, from a network node, information including an indication of the maximum number of physical downlink control channel (e.g., MPDCCH/NPDCCH) repetition and aggregation level(s) for the apparatus. In an embodiment, the indication may be received independent from the physical downlink control channel repetition and aggregation level that the apparatus is configured to monitor for data transfer.

Another embodiment is directed to an apparatus that may include receiving means for receiving, from a network node, information including an indication of the maximum number of physical downlink control channel (e.g., MPDCCH/NPDCCH) repetition and aggregation level(s) for the apparatus. In an embodiment, the indication may be received independent from the physical downlink control channel repetition and aggregation level that the apparatus is configured to monitor for data transfer.

BRIEF DESCRIPTION OF THE DRAWINGS

For proper understanding of the invention, reference should be made to the accompanying drawings, wherein.

DETAILED DESCRIPTION

Figure 1:
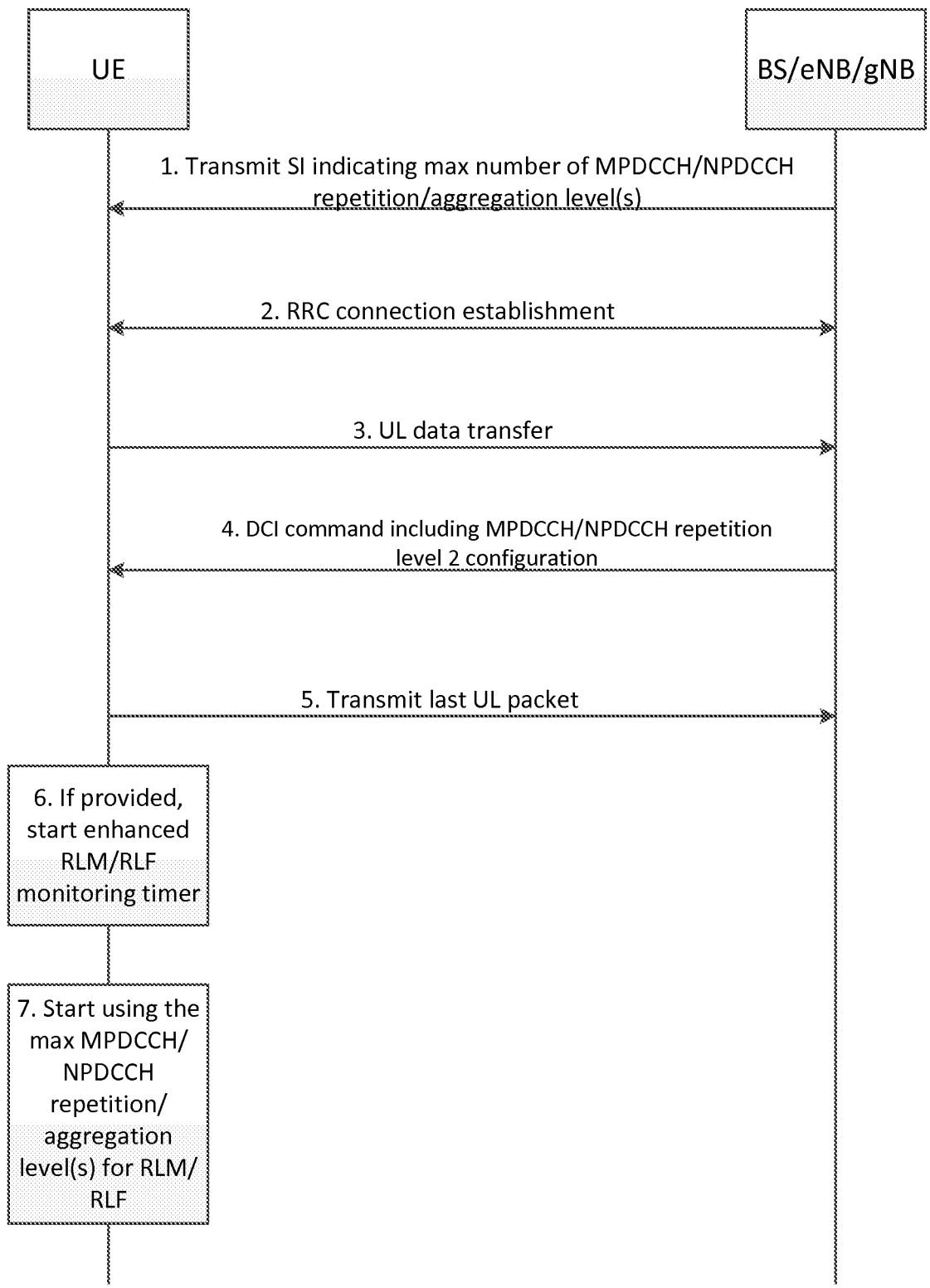
FIG. 1 illustrates an example of a signaling diagram, according to one embodiment.

It will be readily understood that the components of the invention, as generally described and illustrated in the figures herein, may be arranged and designed in a wide variety of different configurations. Thus, the following detailed description of certain embodiments of systems, methods, apparatuses, and computer program products for enhanced radio link monitoring (RLM), as represented in the attached figures and described below, is not intended to limit the scope of the invention but is representative of selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

In 3GPP Release-13 relating to enhanced machine type communication (eMTC) and narrow band internet of things (NB-IoT), it was agreed that the radio link monitoring (RLM) is to be based on the highest configured machine type communication (MTC) physical downlink control channel (MPDCCH) repetition and aggregation level or narrowband IoT (NB-IoT) physical downlink control channel (NPDCCH) repetition and aggregation level. The highest MPDCCH/NPDCCH repetition and aggregation level configured to a specific UE may be different from the maximal MPDCCH repetition and aggregation level that can be supported in a cell. For example, a cell may support a large coverage area with MPDCCH repetition level 256, but if a UE is in a good location in the cell, the UE may be configured with a smaller MPDCCH repetition level, such as 32.

The agreement to use a highest configured MPDCCH repetition and aggregation level for RLM was based on the consideration that a UE cannot receive the MPDCCH transmissions from the cell when it goes beyond the coverage area corresponding to its highest configured MPDCCH repetition and aggregation level, and, following the legacy principle, a radio link failure (RLF) would be triggered.

However, as identified in 3GPP Release-14 further enhancements for MTC (feMTC) and enhanced NB-IoT (eNB-IoT) discussions, such a design causes the problem of triggering unnecessary RLF. For example, when the UE moves towards a cell edge it will cause RLF as the measured signal-to-interference-plus-noise ratio (SINR) will go below $Q_{out}$ (i.e., the level at which the downlink radio link cannot be reliably received), which is calculated corresponding to MPDCCH performance with repetition level 32. In this case, RLF will be triggered and will lead to a waste of radio resources and UE energy to perform re-establishment (very likely toward the same cell). However, as the maximal MPDCCH repetition level supported on the cell level is 256 in this example, this RLF is actually not necessary.

Certain embodiments of the present invention therefore provide solutions for avoiding unnecessary RLF. According to an embodiment, the network may inform UE(s) about the maximal MPDCCH (NPDCCH) repetition and aggregation level supported in the cell. The UE(s) may then use this configuration in RLM. In one embodiment, the UE may then use this configuration when the MPDCCH (NPDCCH) repetition and aggregation level is not updated.

For example, in one embodiment, the UE(s) may be informed about the maximum repetition and aggregation number (or coverage enhancement (CE) level) used in the cell with broadcast and/or dedicated signaling. The UE(s) may then use this information for RLM and RLF triggering. The information may be signaled using new signaling, or existing signaling for MPDCCH/NPDCCH repetition and aggregation level UE is configured to monitor for random access, paging, or any other system information.

According to certain embodiments, the UE(s) may use the information for RLM and RLF triggering either always (i.e., the UE directly uses the network-indicated maximum level) or conditionally (i.e., only when certain conditions are met). For instance, in one example, the conditions may include using the information for RLM and RLF triggering only if data transmission is not active. In this case, a new inactive timer may be provided to monitor downlink (DL)/uplink (UL) transmissions. In other embodiments, the conditions may include using the information for RLM and RLF triggering when the configured coverage enhancement (CE) level differs from maximum CE level, or while a timer is running since last user activity (e.g., configured by an eNB or fixed). These example conditions may be applied individually or in any combination.

It is noted that certain embodiments may be applicable to both eMTC/feMTC and NB-IoT/eNB-IoT, as well as any case where CE mode is used.

FIG. 1 illustrates an example signaling diagram depicting signaling between a UE and network node (e.g., a base station, eNB, or gNB), according to one embodiment. As illustrated in FIG. 1, at 1, the network node may broadcast or signal system information or use other signaling to include an indication of the maximum number of MPDCCH/NPDCCH repetition and aggregation level and/or inactivity timer for enhanced RLM and RLF monitoring. The indication may be independent from the MPDCCH/NPDCCH repetition and aggregation level UE is configured to monitor for data transfer. As one example, in an embodiment, the system information may indicate that the maximum number of NPDCCH repetition is "10" and an inactivity timer (if used) of 3 seconds for enhanced RLM and RLF monitoring. It is noted that this is merely one example of values for a maximum NPDCCH repetition and an inactivity timer expiration time. Further or different values are possible according to other embodiments.

Continuing with FIG. 1, at 2, a RRC connection may be established between the UE and the network node. Then, at 3, UL/DL user data transfer may be started. The network node may transmit, at 4, a DCI command (or RRCConnectionReconfiguration message) that includes a NPDCCH repetition value "2" that is configured for the UE, which the UE may then use for RLM and RLF triggering while in active UL/DL data transmission. The UE may then transmit, at 5, a last UL packet to the network. At 6, the UE may start an "enhanced RLM and RLF monitoring" timer. The UE may then start, at 7, using the NPDCCH repetition value previously signaled by the network (e.g., "10" in the example noted above) for RLM and RLF triggering. For instance, according to the example noted above where the network indicated that the maximum number of NPDCCH repetition is "10" and the inactivity timer is 3 seconds, the UE may wait for 3 seconds for the timer to expire and (since no DL and UL transfer occurred during the period that the timer was running) the UE may then start using NPDCCH repetition value "10" for RLM and RLF triggering.

It should be noted that the process depicted in FIG. 1 may also be applied without the use of the inactivity timer. In this case, the UE may start using the repetition and/or aggregation levels signaled by the network at step 1 (e.g., "10" in the example noted above) once the UL/DL data transmission stops.

Based on the above example depicted in FIG. 1, according to one embodiment, the UE may be informed by the network of the maximum number of repetition and/or aggregation level used in the cell (e.g., "10"). Once data transmission stops (and possibly after the expiry of a timer) the UE stops using the active data transfer repetition/aggregation levels (e.g., "2") and starts using the repetition and/or aggregation levels for when data transmission is not active (e.g., the maximum number of repetition/aggregation levels).

Figure 2A:
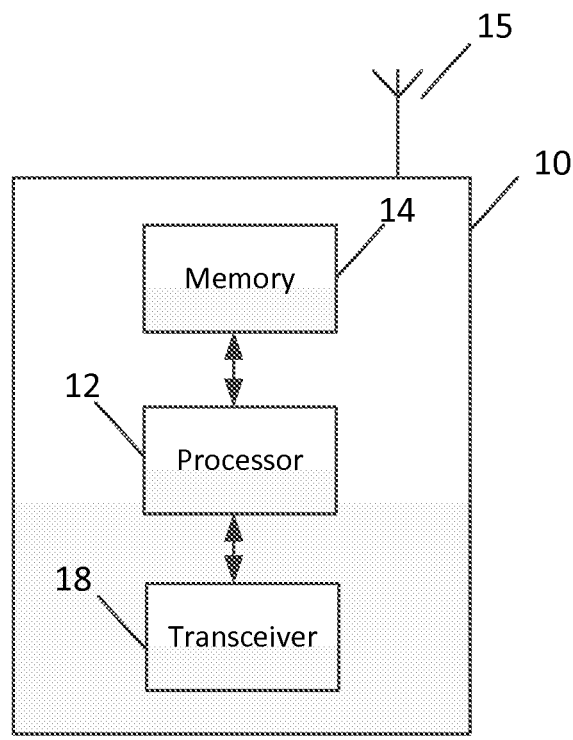
FIG. 2a illustrates an example block diagram of an apparatus, according to an embodiment.

FIG. 2a illustrates an example of an apparatus 10 according to an embodiment. In an embodiment, apparatus 10 may be a node, host, or server in a communications network or serving such a network. For example, apparatus 10 may be a base station, a node B, an evolved node B, 5G node B or access point, next generation node B (NG-NB or gNB), WLAN access point, mobility management entity (MME), or subscription server associated with a radio access network, such as a GSM network, LTE network, 5G or NR radio access technology. It should be understood that apparatus 10 may be comprised of an edge cloud server as a distributed computing system where the server and the radio node may be stand-alone apparatuses communicating with each other via a radio path or via a wired connection, or they may be located in a same entity communicating via a wired connection. It should be noted that one of ordinary skill in the art would understand that apparatus 10 may include components or features not shown in FIG. 2a.

As illustrated in FIG. 2a, apparatus 10 may include a processor 12 for processing information and executing instructions or operations. Processor 12 may be any type of general or specific purpose processor. While a single processor 12 is shown in FIG. 2a, multiple processors may be utilized according to other embodiments. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Processor 12 may perform functions associated with the operation of apparatus 10 which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, LTE, 5G, NB-IoT, feMTC, WLAN, Bluetooth, BT-LE, NFC, radio frequency identifier (RFID), ultrawideband (UWB), and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink). As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In certain embodiments, apparatus 10 may be a network node or RAN node, such as a base station, access point, node B, eNB, 5G or new radio node B (gNB) or access point, WLAN access point, or the like. According to certain embodiments, apparatus 10 may be controlled by memory 14 and processor 12 to perform the functions associated with any of the embodiments described herein. For example, in one embodiment, apparatus 10 may be controlled by memory 14 and processor 12 to broadcast or signal (e.g., via dedicated signaling), to one or more UE(s), system information including an indication of the maximum number of MPDCCH/NPDCCH repetition and aggregation level(s) and/or a possible inactivity timer for enhanced RLM and RLF monitoring. For example, in one embodiment, the system information may indicate that the maximum number of NPDCCH repetition is "10" and possibly indicate an inactivity timer of 3 seconds for enhanced RLM and RLF monitoring. It is noted that this is merely one example of values for a maximum MPDCCH/NPDCCH repetition/aggregation level and an inactivity timer expiration time, and other values are possible according to certain embodiments. In an embodiment, apparatus 10 may then be controlled by memory 14 and processor 12 to establish a RRC connection with the UE(s).

According to certain embodiments, apparatus 10 may also be controlled by memory 14 and processor 12 to receive UL/DL data packets from the UE(s). In an embodiment, apparatus 10 may then be controlled by memory 14 and processor 12 to configure a MPDCCH/NPDCCH repetition value 2 for the UE(s), which the UE(s) may then use for RLM and RLF triggering while in active data transmission.

In some embodiments, apparatus 10 may be controlled by memory 14 and processor 12 to receive, from the UE(s), a last UL packet. If an inactivity timer was indicated by the network, then the UE may start an "enhanced RLM and RLF monitoring" timer and, when the timer expires, the UE may then start using the maximum number of MPDCCH/NPDCCH repetition and aggregation level(s) previously signaled by the apparatus 10 for RLM and RLF triggering. For instance, according to the example noted above where the apparatus 10 indicated that the maximum number of MPDCCH/NPDCCH repetition is "10" and the inactivity timer is 3 seconds, the UE may wait for 3 seconds for the timer to expire and (since no DL and UL transfer during the period that the timer was running) the UE may then start using NPDCCH repetition value "10" for RLM and RLF triggering, as signaled by apparatus 10. If no inactivity timer was indicated, then the UE may start using the maximum number of MPDCCH/NPDCCH repetition and aggregation level(s) previously signaled by the apparatus 10 for RLM and RLF triggering once data transmission stops.

Figure 2B:
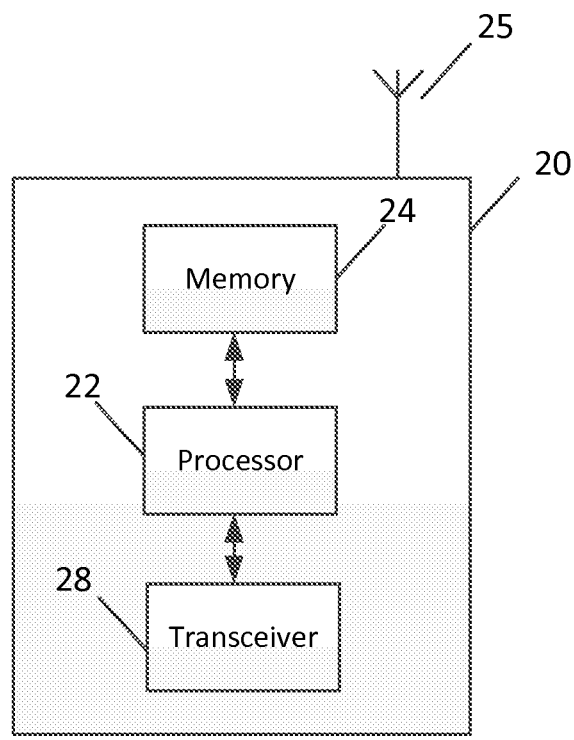
FIG. 2b illustrates an example block diagram of an apparatus, according to another embodiment.

FIG. 2b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, MTC device, or other device. As described herein, UE may alternatively be referred to as, for example, a mobile station, mobile equipment, mobile unit, mobile device, user device, subscriber station, wireless terminal, tablet, smart phone, IoT device or NB-IoT device, MTC device, or the like. As one example, Apparatus 20 may be implemented in, for instance, a wireless handheld device, a wireless plug-in accessory, or the like.

In some example embodiments, apparatus 20 may include one or more processors, one or more computer-readable storage medium (for example, memory, storage, and the like), one or more radio access components (for example, a modem, a transceiver, and the like), and/or a user interface. In some embodiments, apparatus 20 may be configured to operate using one or more radio access technologies, such as GSM, LTE, LTE-A, 5G, NR, NB-IoT, MTC, WLAN, WiFi, Bluetooth, NFC, and any other radio access technologies. It should be noted that one of ordinary skill in the art would understand that apparatus 20 may include components or features not shown in FIG. 2b.

As illustrated in FIG. 2b, apparatus 20 may include or be coupled to a processor 22 for processing information and executing instructions or operations. Processor 22 may be any type of general or specific purpose processor. While a single processor 22 is shown in FIG. 2b, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Processor 22 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 24 can be comprised of any combination of random access memory (RAM), read only memory (ROM), static storage such as a magnetic or optical disk, or any other type of non-transitory machine or computer readable media. The instructions stored in memory 24 may include program instructions or computer program code that, when executed by processor 22, enable the apparatus 20 to perform tasks as described herein.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, NB-IoT, LTE, LTE-A, 5G, NR, MTC, WLAN, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to one embodiment, apparatus 20 may be a UE, mobile device, mobile station, ME, IoT device and/or NB-IoT device, for example. According to certain embodiments, apparatus 20 may be controlled by memory 24 and processor 22 to perform the functions associated with any of the embodiments described herein. In an embodiment, apparatus 20 may be controlled by memory 24 and processor 22 to receive, via broadcast or dedicated signaling, system information including an indication of the maximum number of MPDCCH/NPDCCH repetition and aggregation level(s) and/or an optional inactivity timer for enhanced RLM and RLF monitoring. For example, in one embodiment, the system information may indicate that the maximum number of MPDCCH/NPDCCH repetition is "10" and possibly indicate an inactivity timer of 3 seconds for enhanced RLM and RLF monitoring. As mentioned above, a repetition value of "10" and 3 second expiration timer are merely one possible example of values for a maximum MPDCCH/NPDCCH repetition/aggregation level(s) and an inactivity timer expiration time, and other values are possible according to certain embodiments. In an embodiment, apparatus 20 may be controlled by memory 24 and processor 22 to establish a RRC connection with the network.

According to certain embodiments, apparatus 20 may be further controlled by memory 24 and processor 22 to start transmission of UL/DL data packets to the network. In an embodiment, apparatus 20 may be controlled by memory 24 and processor 22 to receive a configuration of a MPDCCH/NPDCCH repetition value 2 for the apparatus 20, which the apparatus 20 may then use for RLM and RLF triggering while in active UL/DL data transmission.

In some embodiments, apparatus 20 may be controlled by memory 24 and processor 22 to transmit, to the network, a last UL packet. In an embodiment, when an inactivity timer is provided by the network, apparatus 20 may then be controlled by memory 24 and processor 22 to start the enhanced RLM and RLF monitoring timer that expires when a time corresponding to the received inactivity timer value elapses. When the timer expires, apparatus 20 may be controlled by memory 24 and processor 22 to start using the maximum number of MPDCCH/NPDCCH repetition and aggregation level(s) previously signaled by the network for RLM and RLF triggering. For instance, according to the example noted above where the network indicated that the maximum number of MPDCCH/NPDCCH repetition is "10" and the inactivity timer is 3 seconds, the UE may wait for 3 seconds for the timer to expire (assuming no DL and UL transfer during the period that the timer was running) and the apparatus 20 may then start using MPDCCH/NPDCCH repetition value "10" for RLM and RLF triggering, as signaled by the network. When an inactivity timer is not provided by the network, apparatus 20 may be controlled by memory 24 and processor 22 to start using the maximum number of MPDCCH/NPDCCH repetition and aggregation level(s) previously signaled by the network (e.g., "10") for RLM and RLF triggering once the UL/DL data transmission stops.

Figure 3A:
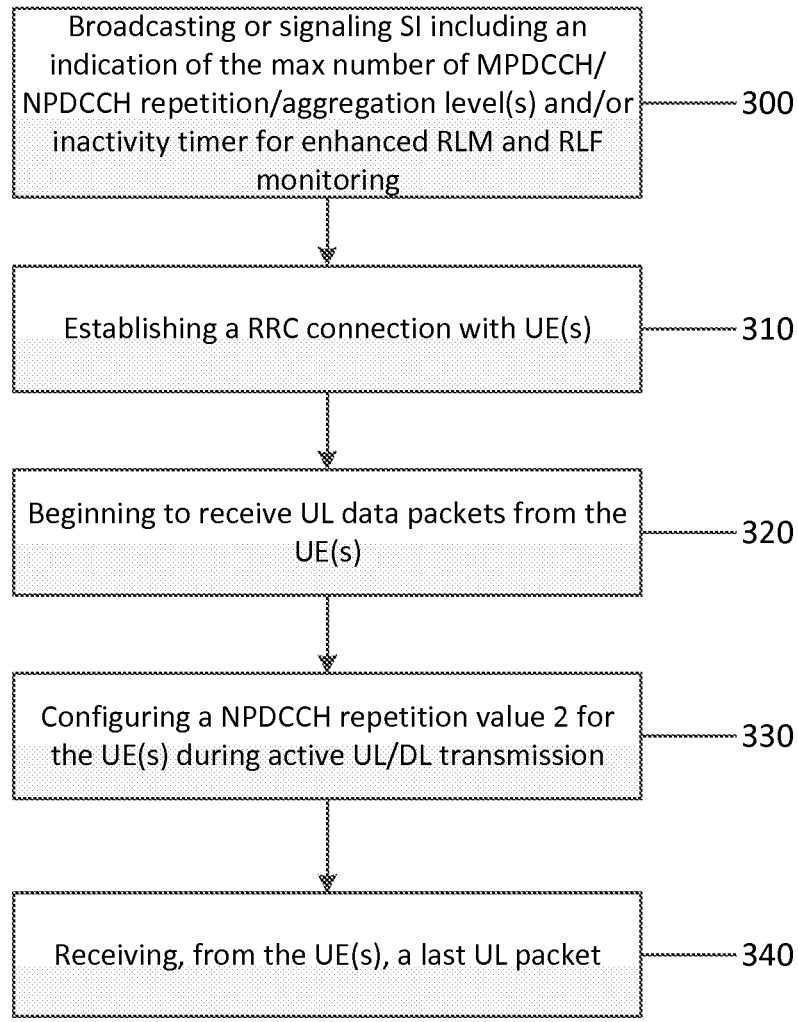
FIG. 3a illustrates an example flow diagram of a method, according to one embodiment.

FIG. 3a illustrates an example flow diagram of a method, according to one embodiment. The method of FIG. 3a may be performed, for example, by a network node, such as a base station, access point, eNB, gNB, or the like. As illustrated in FIG. 3a the method may include, at 300, broadcasting or signaling (e.g., via dedicated signaling), to one or more UE(s), system information including an indication of the maximum number of MPDCCH/NPDCCH repetition and aggregation level(s) and/or an optional inactivity timer for enhanced RLM and RLF monitoring. In an embodiment, the method may then include, at 310, establishing a RRC connection with the UE(s). According to certain embodiments, the method may also include, at 320, beginning to receive UL data packets from the UE(s). In an embodiment, the method may further include, at 330, configuring a NPDCCH repetition value 2 for the UE(s), which the UE(s) may then use for RLM and RLF triggering during active transmission. In some embodiments, the method may also include, at 340, receiving, from the UE(s), a last UL packet. If an inactivity timer was provided, then the UE(s) may start an "enhanced RLM and RLF monitoring" timer and, when the timer expires, the UE may then start using the MPDCCH/NPDCCH repetition value previously signaled by the network node for RLM and RLF triggering. If an inactivity timer was not provided, then the UE(s) may start using the maximum number of MPDCCH/NPDCCH repetition and aggregation level(s) previously signaled by the network node for RLM and RLF triggering once the data transmission stops (i.e., after receiving the last UL packet from the UE(s)).

Figure 3B:
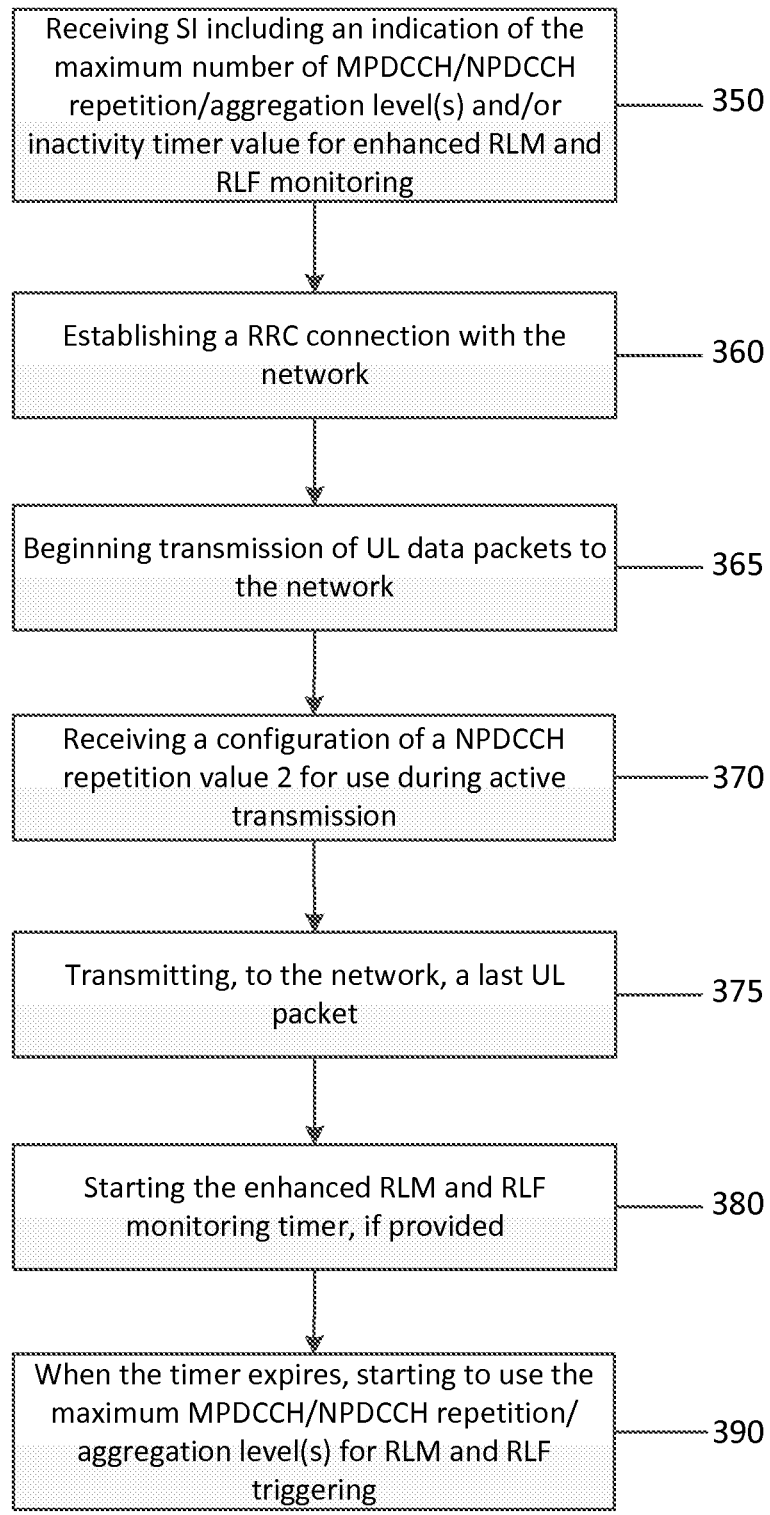
FIG. 3b illustrates an example flow diagram of a method, according to another embodiment.

FIG. 3b illustrates an example flow diagram of a method, according to one embodiment. The method of FIG. 3b may be performed, for example, by a UE, mobile station, mobile device, IoT device, MTC device, or the like. As illustrated in FIG. 3b the method may include, at 350, receiving, via broadcast or dedicated signaling, system information including an indication of the maximum number of MPDCCH/NPDCCH repetition and aggregation level(s) and/or an optional inactivity timer value for enhanced RLM and RLF monitoring. In an embodiment, the method may also include, at 360, establishing a RRC connection with the network. According to certain embodiments, the method may also include, at 365, beginning transmission of UL data packets to the network. In an embodiment, the method may further include, at 370, receiving a configuration of a MPDCCH/NPDCCH repetition value 2 for the UE, which the UE may then use for RLM and RLF triggering during active data transmission. In some embodiments, the method may also include, at 375, transmitting, to the network, a last UL packet. In an embodiment, if an inactivity timer was received, the method may then include, at 380, starting an enhanced RLM and RLF monitoring timer that expires based on the received inactivity timer value. When the timer expires, the method may include, at 390, starting to use the maximum number of MPDCCH/NPDCCH repetition and aggregation level(s) previously signaled by the network for RLM and RLF triggering. In other embodiments, if no inactivity timer was signaled by the network, then the method may include starting to use the maximum number of MPDCCH/NPDCCH repetition and aggregation level(s) previously signaled by the network for RLM and RLF triggering when data transmission stops.

In view of the above, embodiments of the invention provide several technical effects. For example, certain embodiments provide improved radio link monitoring for UEs, such as narrowband devices, IoT devices, and/or machine type communication (MTC) devices. As such, embodiments of the invention can improve performance and throughput of network nodes including, for example, base stations, eNBs, gNBs and/or UEs. Accordingly, the use of embodiments of the invention result in improved functioning of communications networks and their nodes.

In some embodiments, the functionality of any of the methods, processes, signaling diagrams, or flow charts described herein may be implemented by software and/or computer program code or portions of code stored in memory or other computer readable or tangible media, and executed by a processor.

In certain embodiments, an apparatus may be included or be associated with at least one software application, module, unit or entity configured as arithmetic operation(s), or as a program or portions of it (including an added or updated software routine), executed by at least one operation processor. Programs, also called computer program products or computer programs, including software routines, applets and macros, may be stored in any apparatus-readable data storage medium and include program instructions to perform particular tasks.

A computer program product may comprise one or more computer-executable components which, when the program is run, are configured to carry out embodiments described herein. The one or more computer-executable components may include at least one software code or portions of code. Modifications and configurations required for implementing the functionality of an embodiment may be performed as routine(s), which may be implemented as added or updated software routine(s). In some embodiments, software routine(s) may be downloaded into the apparatus.

Software or a computer program code or portions of code may be in a source code form, object code form, or in some intermediate form, and may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and/or software distribution package, for example. Depending on the processing power needed, the computer program may be executed in a single electronic digital device or it may be distributed amongst a number of devices or computers. The computer readable medium or computer readable storage medium may be a non-transitory medium.

In other embodiments, the functionality may be performed by hardware, for example through the use of an application specific integrated circuit (ASIC), a programmable gate array (PGA), a field programmable gate array (FPGA), or any other combination of hardware and software. In yet another embodiment, the functionality may be implemented as a signal, a non-tangible means that can be carried by an electromagnetic signal downloaded from the Internet or other network.

According to an embodiment, an apparatus, such as a node, device, or a corresponding component, may be configured as a computer or a microprocessor, such as single-chip computer element, or as a chipset, including at least a memory for providing storage capacity used for arithmetic operation(s) and an operation processor for executing the arithmetic operation.

One embodiment is directed to a method that may include broadcasting or signaling, by a network node, to one or more UE(s), information including an indication of the maximum number of MPDCCH/NPDCCH repetition and aggregation level(s) and/or inactivity timer for enhanced RLM and RLF monitoring. In an embodiment, the indication may be independent from the MPDCCH/NPDCCH repetition and aggregation level UE is configured to monitor for data transfer.

Another embodiment is directed to an apparatus that may include at least one processor and at least one memory including computer program code. The at least one memory and the computer program code are configured, with the at least one processor, to cause the apparatus to broadcast or signal to one or more UE(s), information including an indication of the maximum number of MPDCCH/NPDCCH repetition and aggregation level(s) and/or inactivity timer for enhanced RLM and RLF monitoring. In an embodiment, the indication may be independent from the MPDCCH/NPDCCH repetition and aggregation level UE is configured to monitor for data transfer.

Another embodiment is directed to an apparatus that may include transmitting means for broadcasting or signaling to one or more UE(s), information including an indication of the maximum number of MPDCCH/NPDCCH repetition and aggregation level(s) and/or inactivity timer for enhanced RLM and RLF monitoring. In an embodiment, the indication may be independent from the MPDCCH/NPDCCH repetition and aggregation level UE is configured to monitor for data transfer.

Another embodiment is directed to a method that may include receiving, from a network node, information including an indication of the maximum number of MPDCCH/NPDCCH repetition and aggregation level(s) and/or inactivity timer for enhanced RLM and RLF monitoring to be used by UE. In an embodiment, when an inactivity timer is received, the method may also include starting an enhanced RLM and RLF monitoring timer and when the timer expires, starting to use the maximum number of MPDCCH/NPDCCH repetition and aggregation level(s) previously signaled by the network for RLM and RLF triggering. In an embodiment, the indication may be received independent from the MPDCCH/NPDCCH repetition and aggregation level UE is configured to monitor for data transfer.

Another embodiment is directed to an apparatus that may include at least one processor and at least one memory including computer program code. The at least one memory and the computer program code are configured, with the at least one processor, to cause the apparatus to receive, from a network node, information including an indication of the maximum number of MPDCCH/NPDCCH repetition and aggregation level(s) and/or inactivity timer for enhanced RLM and RLF monitoring to be used by the apparatus. When an inactivity timer is received, the at least one memory and the computer program code may be further configured, with the at least one processor, to cause the apparatus to start an enhanced RLM and RLF monitoring timer And, when the timer expires, to use the maximum number of MPDCCH/NPDCCH repetition and aggregation level(s) previously signaled by the network for RLM and RLF triggering. In an embodiment, the indication may be received independent from the MPDCCH/NPDCCH repetition and aggregation level UE is configured to monitor for data transfer.

Another embodiment is directed to an apparatus that may include receiving means for receiving, from a network node, information including an indication of the maximum number of MPDCCH/NPDCCH repetition and aggregation level(s) and/or inactivity timer for enhanced RLM and RLF monitoring to be used by UE. In an embodiment, when an inactivity timer is received, the apparatus may also include starting means for starting an enhanced RLM and RLF monitoring timer and, when the timer expires, using means for starting to use the maximum number of MPDCCH/NPDCCH repetition and aggregation level(s) previously signaled by the network for RLM and RLF triggering. In an embodiment, the indication may be received independent from the MPDCCH/NPDCCH repetition and aggregation level UE is configured to monitor for data transfer.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. An apparatus, comprising:
   at least one processor; and
   at least one memory including computer program code,
   the at least one memory and the computer program code are configured, with the at least one processor, to cause the apparatus at least to
   signal information to at least one user equipment,
   wherein the information comprises an indication of a maximum number of physical downlink control channel repetition and aggregation level(s) supported in a cell,
   wherein the indication is independent from the physical downlink control channel repetition and aggregation level that the at least one user equipment is configured to monitor for data transfer,
   wherein the information further comprises another indication to the at least one user equipment of whether to use, for radio link monitoring, the physical downlink control channel repetition and aggregation level that the at least one user equipment is configured to monitor for data transfer or the maximum number of physical downlink control channel repetition and aggregation level(s) previously signaled by the apparatus.

2. The apparatus according to claim 1, wherein the physical downlink control channel comprises at least one of a machine type communication physical downlink control channel or a narrowband-internet of things physical downlink control channel.

3. The apparatus according to claim 1, wherein the indication in the information further comprises an optional inactivity timer for at least one of enhanced radio link monitoring or radio link failure monitoring.

4. A method, comprising:
   receiving at a user equipment, from a network node, information comprising an indication of a maximum number of physical downlink control channel repetition and aggregation level(s) supported in a cell;
   wherein the indication is independent from the physical downlink control channel repetition and aggregation level that the user equipment is configured to monitor for data transfer,
   wherein the information further comprises another indication on whether to use, for radio link monitoring, the physical downlink control channel repetition and aggregation level that the user equipment is configured to monitor for data transfer or the maximum number of physical downlink control channel repetition and aggregation level(s) previously received from the network node.

5. The method according to claim 4, wherein the physical downlink control channel comprises at least one of a machine type communication physical downlink control channel or a narrowband-internet of things physical downlink control channel.

6. The method according to claim 4, wherein the indication in the information further comprises an optional inactivity timer for at least one of enhanced radio link monitoring or radio link failure monitoring to be used by the user equipment.

7. The method according to claim 4, further comprising:
   when the inactivity timer is received, starting an enhanced radio link monitoring and radio link failure monitoring timer and when the timer expires, starting to use the maximum number of the physical downlink control channel repetition and aggregation level(s) signaled by the network node for radio link monitoring and radio link failure triggering.

8. The method according to claim 4, further comprising:
   while the inactivity timer is running, using, for radio link monitoring, the physical downlink control channel repetition and aggregation level that the user equipment is configured to monitor for data transfer.

9. The method according to claim 4, further comprising:
   when no inactivity timer is signaled by the network node, starting to use the maximum number of the physical downlink control channel repetition and aggregation level(s) signaled by the network node for radio link monitoring and radio link failure triggering after a last uplink data packet is transmitted by the user equipment.

10. An apparatus, comprising:
    at least one processor; and
    at least one memory including computer program code,
    the at least one memory and the computer program code are configured, with the at least one processor, to cause the apparatus at least to
    receive, from a network node, information comprising an indication of a maximum number of physical downlink control channel repetition and aggregation level(s) supported in the cell;
    wherein the indication is independent from the physical downlink control channel repetition and aggregation level that the apparatus is configured to monitor for data transfer,
    wherein the information further comprises another indication on whether to use, for radio link monitoring, the physical downlink control channel repetition and aggregation level that the user equipment is configured to monitor for data transfer or the maximum number of physical downlink control channel repetition and aggregation level(s) previously received by the apparatus.

11. The apparatus according to claim 10, wherein the physical downlink control channel comprises at least one of a machine type communication physical downlink control channel or a narrowband-internet of things physical downlink control channel.

12. The apparatus according to claim 10, wherein the indication in the information further comprises an optional inactivity timer for at least one of enhanced radio link monitoring or radio link failure monitoring to be used by the apparatus.

13. The apparatus according to claim 10, wherein the at least one memory and the computer program code are further configured, with the at least one processor, to cause the apparatus at least to:
when the inactivity timer is received, start an enhanced radio link monitoring and radio link failure monitoring timer and when the timer expires, start to use the maximum number of the physical downlink control channel repetition and aggregation level(s) signaled by the network node for radio link monitoring and radio link failure triggering.

14. The apparatus according to claim 10, wherein the at least one memory and the computer program code are further configured, with the at least one processor, to cause the apparatus at least to:
while the inactivity timer is running, use, for radio link monitoring, the physical downlink control channel repetition and aggregation level that the user equipment is configured to monitor for data transfer.

15. The apparatus according to claim 10, wherein the inactivity timer is re-started when the user equipment receives uplink or downlink grant for data scheduling.

16. The apparatus according to claim 10, wherein the at least one memory and the computer program code are further configured, with the at least one processor, to cause the apparatus at least to:
when no inactivity timer is signaled by the network node, start to use the maximum number of the physical downlink control channel repetition and aggregation level(s) signaled by the network node for radio link monitoring and radio link failure triggering after a last uplink data packet is transmitted by the apparatus.

17. The apparatus according to claim 10, wherein the at least one memory and the computer program code are further configured, with the at least one processor, to cause the apparatus at least to:
use the received configuration for radio link monitoring and radio link failure triggering during active data transmission.

* * * * *